United States Patent
Lan et al.

(10) Patent No.: US 8,427,446 B2
(45) Date of Patent: Apr. 23, 2013

(54) TOUCH PANEL AND PERIPHERAL CIRCUIT THEREOF

(75) Inventors: Kuo-Hua Lan, Hsin-Chu (TW); Fu-Ming Chang, Hsin-Chu (TW); Che-Cheng Kuo, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 390 days.

(21) Appl. No.: 12/964,875

(22) Filed: Dec. 10, 2010

(65) Prior Publication Data

US 2012/0044160 A1 Feb. 23, 2012

(30) Foreign Application Priority Data

Aug. 17, 2010 (TW) .............................. 99127464 A

(51) Int. Cl.
*G06F 3/041* (2006.01)

(52) U.S. Cl.
USPC ....................................... 345/173; 178/18.03

(58) Field of Classification Search .................. 345/173, 345/174, 204–206; 178/18.01, 18.03, 18.05, 178/18.06
See application file for complete search history.

(56) References Cited

U.S. PATENT DOCUMENTS

2003/0134095 A1* 7/2003 Bottari et al. ................. 428/209
2009/0303189 A1* 12/2009 Grunthaner et al. .......... 345/173

FOREIGN PATENT DOCUMENTS

TW           I289780         11/2007

OTHER PUBLICATIONS

English language translation of abstract of TW I289780 (published Nov. 11, 2007).

* cited by examiner

*Primary Examiner* — Regina Liang
(74) *Attorney, Agent, or Firm* — McClure, Qualey & Rodack, LLP

(57) ABSTRACT

A touch panel and a peripheral circuit thereof are provided. Each bonding pad of the peripheral circuit includes a first conductive layer, a first protective layer, a second conductive layer, and a second protective layer sequentially arranged on a substrate from bottom to top. A covered area of the second conductive layer provided by the second protective layer is increased to cover a portion of the second conductive layer located above a junction area between the first protective layer and a terminal part of the first conductive layer, thereby increasing the reliability of the bonding pads.

12 Claims, 4 Drawing Sheets

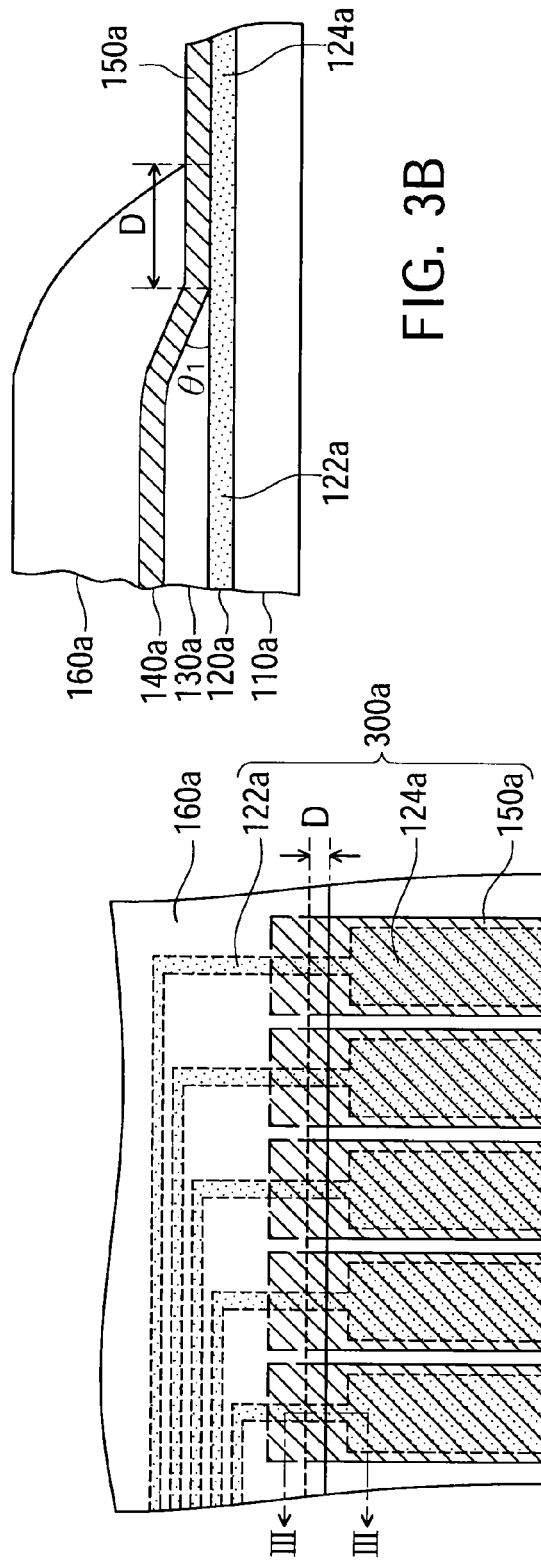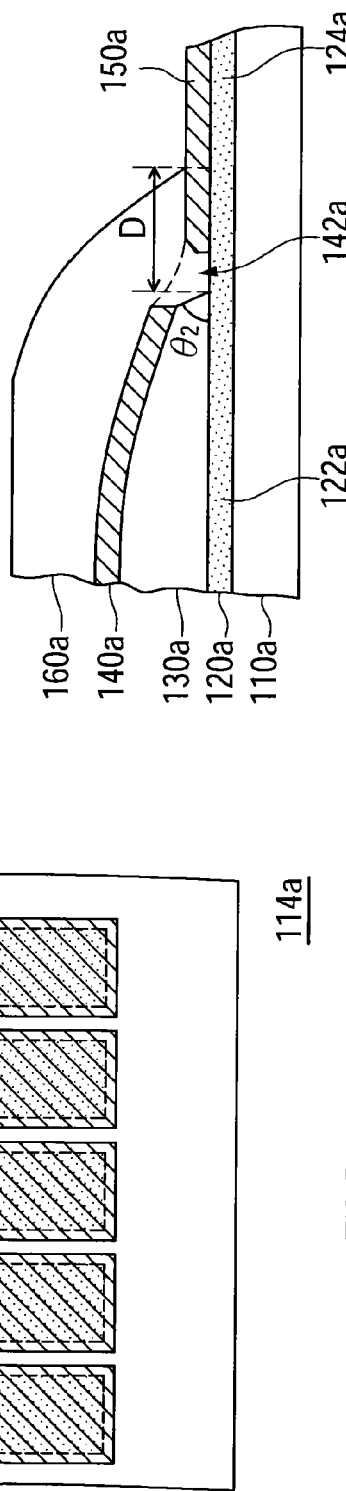
FIG. 3B
FIG. 3C
FIG. 3A

TOUCH PANEL AND PERIPHERAL CIRCUIT THEREOF

RELATED APPLICATIONS

This application claims priority to Taiwan Application Serial Number 099127464, filed Aug. 17, 2010, which is herein incorporated by reference.

BACKGROUND

1. Field of Invention

The present invention relates to a touch panel. More particularly, the present invention relates to a touch panel and its peripheral circuit.

2. Description of Related Art

Recently, flat-panel displays with small volumes have become the displays popularly used in various electronic products. In order to achieve the objects of operation convenience, concise appearance and integrated functions, many information products have been switched to using a touch panel as an input device from traditional input devices such as a keyboard, a mouse, etc.

With the advanced developments of flat-panel displays and touch-control input devices, in order to allow a user to have a larger viewable image and more convenient operation modes under a limited space, some electronic products have combined the touch panel with the display panel as a touch display panel. Since having the display function of the display panel and the operation convenience using the touch panel for input, the touch display panel has gradually become an important option to various electronic products such as a handheld personal computer (PC), a personal digital assistance (PDA) and a smart phone, etc.

The operation mode of the touch panel is described hereinafter. When a conductive article (such as a finger) touches a touch sensor array of the touch panel, an electrical property (such as an electrical resistance value or capacitance value) will be changed accordingly, thus causing the touch sensor array to have a bias change. The change of the electrical property will be transformed to a control signal, and the control signal will be transmitted to an external control circuit board for being processed and computed by a central processing unit (CPU) to obtain a result. Thereafter, a display signal will be outputted to a display panel via the external control circuit board, thereby displaying an image to a user. The stability and reliability of touch signal transmission determined whether the action of the touch panel is correct. Therefore, the stability and reliability of signal transmission between the touch panel and the external electrical circuit is an important issue to touch the panel industry.

SUMMARY

In view of the above, the present invention provides a touch panel and its peripheral circuit. In the peripheral circuit of the touch panel, a bonding pad structure has better connection stability, thus increasing process tolerance and enhancing the connection reliability between the touch panel and its external peripheral circuit board.

In accordance with one embodiment, the aforementioned bonding pad structure includes a first conductive layer, a first protective layer, a second conductive layer and a second protective layer, which are sequentially arranged on a substrate from bottom to top. The aforementioned first conductive layer includes a circuit part and a terminal part, wherein the circuit part is located near a central sensing array area of the substrate, and the terminal part is located far away from a central sensing array area of the substrate. The aforementioned first protective layer covers the circuit part and exposes the terminal part. The aforementioned second conductive layer is located on the first protective layer and the terminal part, and includes a bonding part located on the terminal part. An outer edge of the aforementioned second protective layer exceeds an outer edge of the first protective layer, and covers the second conductive layer located above a junction area between the first protective layer and the terminal part.

The second conductive layer located above a junction area between the first protective layer and the terminal part often has structural defects due to various process factors. Thus, when covering the second conductive layer located at this area, the second protective layer can protect possible structural defects of the second conductive layer, thereby overcoming the problems of broken bonding pads.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

FIG. 2B and FIG. 2C are schematic diagrams showing respective cross-sectional structures viewed along line II-II shown in FIG. 2A, wherein FIG. 2B illustrates a normal bonding pad structure, and FIG. 2C illustrates a bonding pad structure with a defective conductive layer;

FIG. 3A is a schematic top view showing a locally enlarged non-array area of a touch panel according to one embodiment of the present invention;

FIG. 3B and FIG. 3C are schematic diagrams showing respective cross-sectional structures viewed along line III-III shown in FIG. 3A, wherein FIG. 3B illustrates a normal bonding pad structure, and FIG. 3C illustrates a bonding pad structure with a defective conductive layer.

DESCRIPTION OF THE PREFERRED EMBODIMENTS

Figure 1:
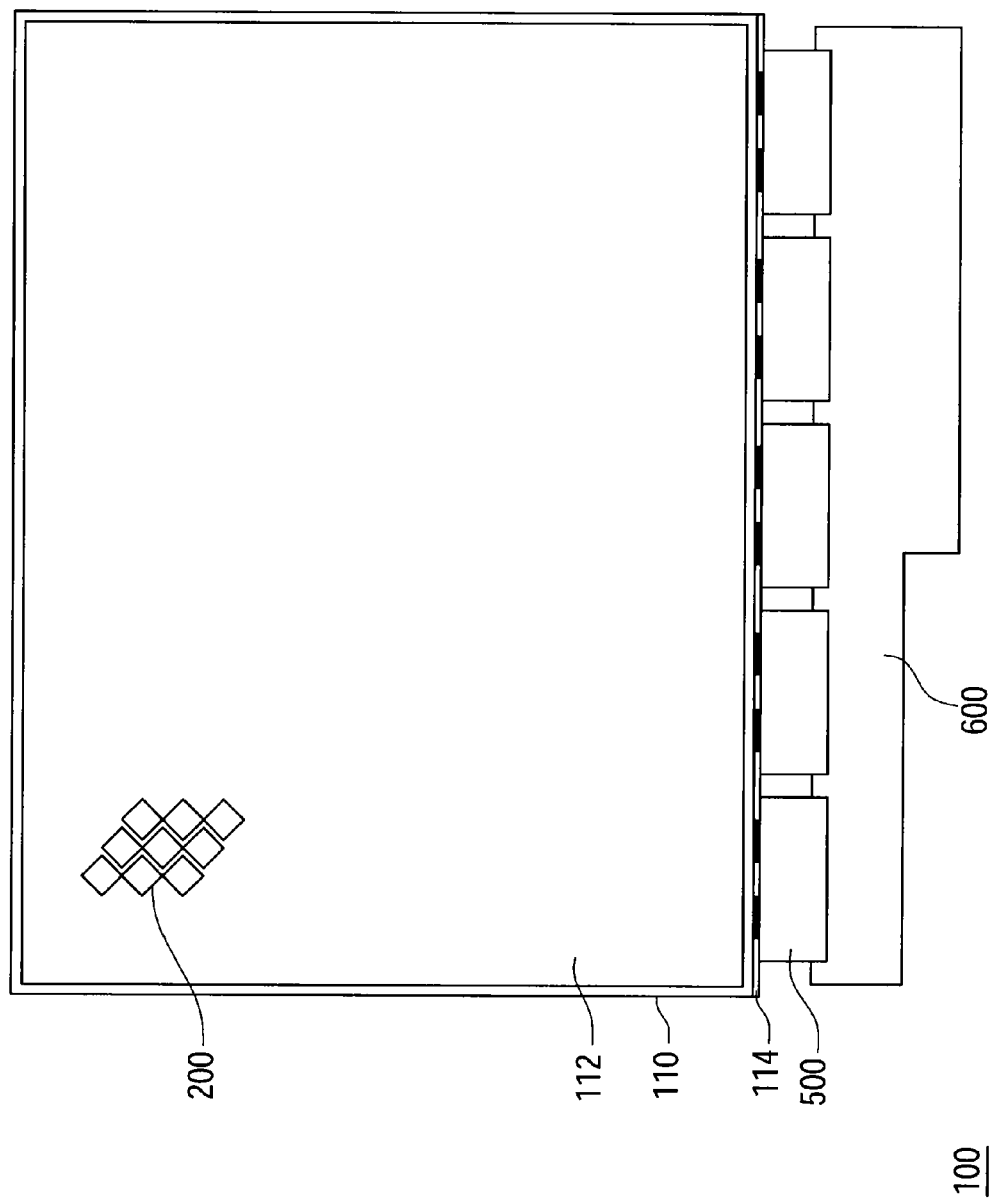
FIG. 1 is a schematic top view showing a typical touch panel.

Reference will now be made in detail to the present preferred embodiments of the invention, examples of which are illustrated in the accompanying drawings. Wherever possible, the same reference numbers are used in the drawings and the description to refer to the same or like parts.

According to the above description, the present invention provides a touch panel and its peripheral circuit. In the peripheral circuit of the touch panel, the bonding pad structure has better connection stability, and thus process tolerance can be increased and the connection reliability between the touch panel and its external peripheral circuit board can be enhanced. An exemplified structure of the aforementioned bonding structure and its exemplified fabrication method will be described in the below. For easily understanding the embodiments of the present invention, quite a few technical details will be provided, but not all of the embodiments require all of those technical details. Meanwhile, some well-known structures or elements will be schematically illustrated in figures, thereby simplifying the contents of the figures.

Referring to FIG. 1, FIG. 1 is a schematic top view showing a typical touch panel. In FIG. 1, a touch panel 100 includes a substrate 110, a plurality of signal circuit boards 500 and an external circuit board 600. On the substrate 110, there are an array area 112 located at a central portion thereof and a non-array area 114 located at a peripheral portion thereof. There is a touch sensor array 200 disposed in the array area 112. The aforementioned signal circuit boards 500 are used to connect the touch sensor array 200 located at the substrate 110 to the external circuit board 600, thereby performing signal transmission between the touch sensor array 200 and the external circuit board 600.

The aforementioned signal circuit boards 500 can be chip on glass (COG) boards, chip on film (COF) boards, tape automatic bonding (TAB) boards or flexible printed circuit (FPC) boards.

In general, the aforementioned touch sensor array 200 is composed of two-dimensional sensor cascades arranged horizontally and vertically. When a user touches the control panel 100 with a finger, the touch sensor array 200 generates an electrical property change at its position touched by the user's finger. Thus, the control panel 100 can compute a proper instruction based on the electrical property change and provide a correct image displayed to the user.

The typical touch panel often suffers the problem of touch-control malfunction, such as poor touch signal transmission sensitivity or even transmission interruption, and the problem often occurs at the touch sensor array 200, signal circuit boards 500 or external circuit board 600. After multiple tests, it is found that one of the most common factors causing the aforementioned problem resides in the poor connection stability between the touch sensor array 200 and the signal circuit boards 500, which is described in detail as follows.

Figure 2B:
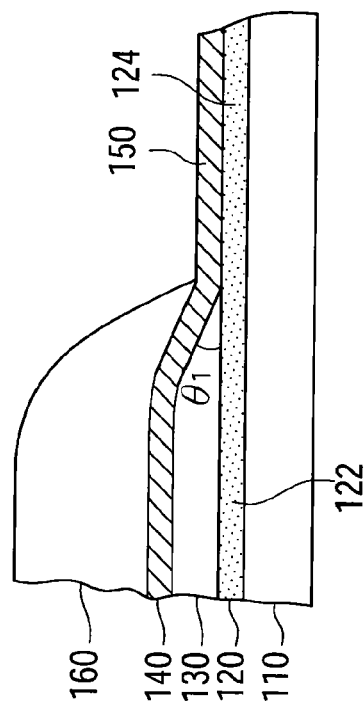
Figure 2C:
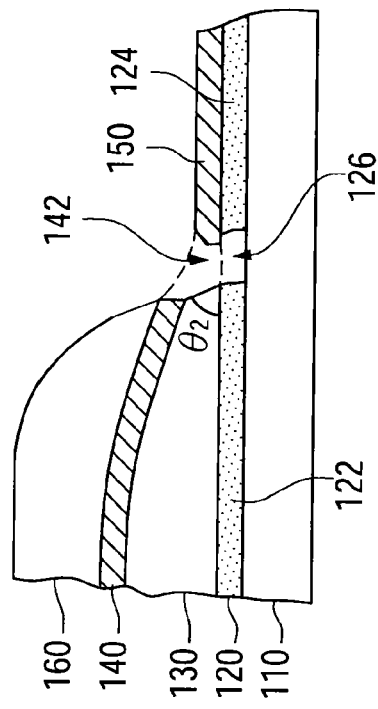
Figure 2A:
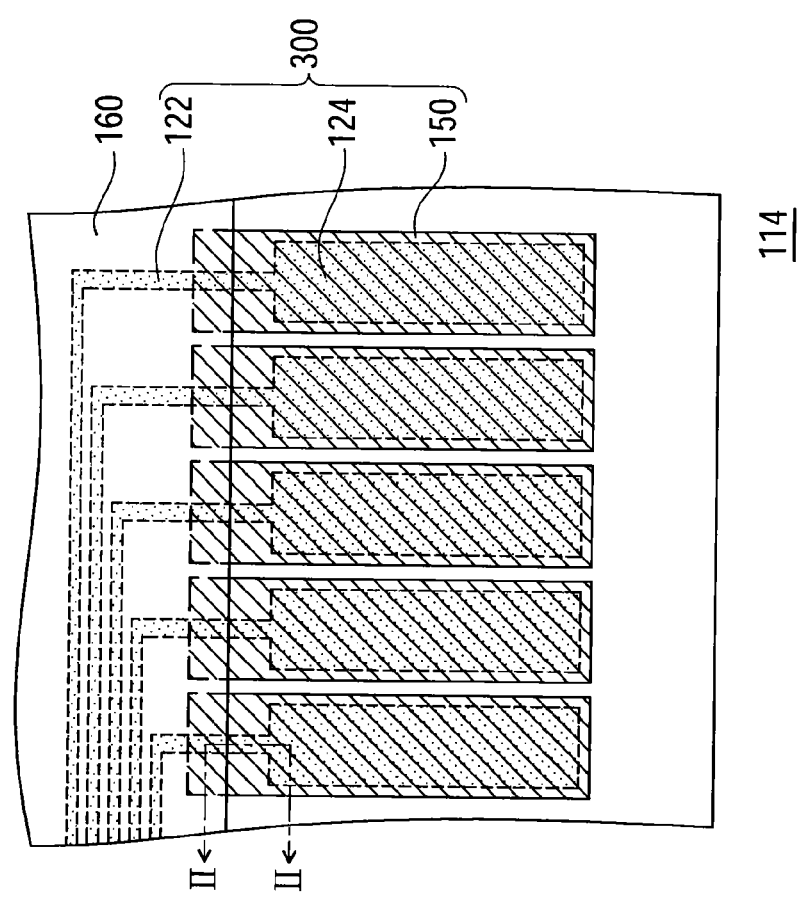
FIG. 2A is a schematic top view showing a locally enlarged non-array area of the touch panel shown in FIG. 1.

In the non-array area 114 of FIG. 1, a structure with a plurality of bonding pads respectively connected to the touch sensor array 200 is generally disposed as shown in FIG. 2A to FIG. 2C. FIG. 2A is a schematic top view showing a locally enlarged non-array area of the touch panel shown in FIG. 1. FIG. 2B and FIG. 2C are schematic diagrams showing respective cross-sectional structures viewed along line II-II shown in FIG. 2A, wherein FIG. 2B illustrates a normal bonding pad structure, and FIG. 2C illustrates a bonding pad structure with a defective conductive layer.

In FIG. 2A, each bonding pad 300 is composed of a circuit part 122, a terminal part 124 and a bonding part 150, wherein the circuit part 122 and the terminal part 124 are constructed from a first conductive layer at a lower level, and the bonding part 150 is constructed from a second conductive layer at an upper level. Thus, the aforementioned signal circuit boards 500 shown in FIG. 1 is electrically connected to the terminal part 124 via the bonding part 150, and the detailed structure thereof is shown in FIG. 2B.

In FIG. 2B, a first conductive layer 120, a first protective layer 130, a second conductive layer 140 and a second protective layer 160 are sequentially formed on the substrate 110, wherein the first protective layer 130 is mainly used to cover the circuit part 122 of the first conductive layer 120 and to expose the terminal part 124. Similarly, the second protective layer 160 also covers a portion of the second conductive layer 140 and exposes the bonding part 150 of the second conductive layer 140.

Commonly speaking, the film material, the process stability of film-forming equipment, the elevation difference and slope value with the profile of the substrate, all will affect the film uniformity of the conductive layer. When the first conductive layer 120 is deposited, since no patterned films have been deposited on the substrate 110 yet, the profile of the substrate hardly affects the film uniformity. Therefore, the film uniformity of the first conductive layer 110 is mainly affected by the film material and the process stability of film-forming equipment. However, while the second conductive layer 140 is deposited, the patterned first protective layer 130 has been formed on the substrate 110, and thus the film uniformity of the second conductive layer 140 is affected by the film material, the process stability of film-forming equipment, the elevation difference and slope value with the profile of the substrate.

Since the first protective layer 130 does not cover the first conductive layer 120 entirely, the elevation difference and slope value between the first protective layer 130 and the terminal part 124 will affect whether the second conductive layer 140 can be formed continuously when the second conductive layer 140 is desired to be deposited on the first protective layer 130 and the terminal part 124 subsequently. As shown in FIG. 2B, if the elevation difference between the first protective layer 130 and the terminal part 124 is not large, or the slop at the edge of the first protective layer 130 is relatively mild (the slop $\theta_1$ is about 15-50 degrees), then the second conductive layer 140 can be formed as a continuous film which may provide full protection to the first conductive layer 140, thus preventing the problem of touch control malfunction.

However, as shown in FIG. 2C, if the elevation difference between the first protective layer 130 and the terminal part 124 is relatively large, or the slop at the edge of the first protective layer 130 is relatively step (the slop $\theta_2$ is about 50-90 degrees), then it is not easy to form a continuous film at a junction area between the first protective layer 130 and the terminal part 124, thus forming a defect 142. Thus, the defect 142 of the second conductive layer 140 fails to provide full protection to the first conductive layer 120. In the subsequent processes, when the second protective layer 160 is formed from a light-sensitive organic material, a lithographic process is directly performed on the second protective layer 160 so as to pattern the second protective layer 160. At this point, an alkaline developer, such as tetramethyl ammonium hydroxide (TMAH) or sodium hydroxide, will directly contact the first conductive layer 120 through the defect 142 thereabove, such that the first conductive layer 120 is eroded and a defect 126 is formed therein. Since the bonding pad 300 is electrically connected to the touch sensor array, it is easy to cause the problem of poor touch signal transmission or ever signal interruption when the first conductive layer 120 and the second conductive layer 140 both have the structural defects.

Under the current situation of using a large-sized mother glass to fabricate a display panel, it is very difficult to avoid the aforementioned problem. Since the large-sized mother glass has quite a large area, it is difficult to achieve the object of film uniformity. In other words, it is not easy to let each area of the large-sized mother glass undergo the same or just similar process conditions, such that the respective different areas of the large-sized mother glass often have different film thickness. In addition, the layers formed in the previous processes affect the elevation difference and slop of the substrate profile. Thus, some of areas on the large-sized mother glass always have the problem of structural defects shown in FIG. 2C.

Hence, the present invention provides a bonding pad of which the structure can be referred to FIG. 3A to FIG. 3C. FIG. 3A is a schematic top view showing a locally enlarged non-array area of a touch panel according to one embodiment of the present invention. FIG. 3B and FIG. 3C are schematic diagrams showing respective cross-sectional structures viewed along line III-III shown in FIG. 3A, wherein FIG. 3B illustrates a normal bonding pad structure, and FIG. 3C illustrates a bonding pad structure with a defective conductive layer.

In FIG. 3A, each bonding pad 300a is constructed from a circuit part 122a located near an array area of a substrate 110a, a terminal part 124a located away from the array area, and a bonding part 150a located above the terminal part 124a, wherein the circuit part 122a and the terminal part 124a are constructed from a first conductive layer 120a at a lower level, and the bonding part 150a is constructed from a second conductive layer 140a at an upper level, and is electrically connected to the terminal part 124a, wherein the detailed structure thereof is shown in FIG. 3B and FIG. 3C.

In FIG. 3B and FIG. 3C, the first conductive layer 120a, a first protective layer 130a, the second conductive layer 140a and a second protective layer 160a are sequentially formed on the substrate 110a, wherein the first protective layer 130a is mainly used to cover the circuit part 122a of the first conductive layer 120a and to expose the terminal part 124a. Similarly, the second protective layer 160a also merely covers a portion of the second conductive layer 140a and exposes the bonding part 150a of the second conductive layer 140a.

It is noted that, in FIG. 3B and FIG. 3C, an outer edge of the second protective layer 160a extends outwards a distance D from an outer edge of the first protective layer 130a, such that the second protective layer 160a can cover a junction area between the first protective layer 130a and the terminal part 124a, i.e. can cover the area of the second conductive layer susceptible to defects. According to one embodiment, the aforementioned distance D can be such as between 1 μm and 40 μm. In contrast, the outer edge of the protective layer 160 shown in FIG. 2B and FIG. 2C is aligned with that of the first protective layer 130, and thus is very different from this embodiment.

Hence, it can be clearly seen from FIG. 3C that, since the second protective layer 160a covers a defect 142a of the second conductive layer 140a, the developer in the lithographic process can be prevented from contacting the first conductive layer 120a via the defect 142a of the second conductive layer 140a. Therefore, the new bonding pad structure shown in FIG. 3A to FIG. 3C can prevent the first conductive layer 120a from being eroded or even interrupted, thus promoting the signal transmission stability between the touch panel and the external circuit board. Further, this new bonding pad structure can increase process tolerance and greatly increase product yield.

Figure 4:
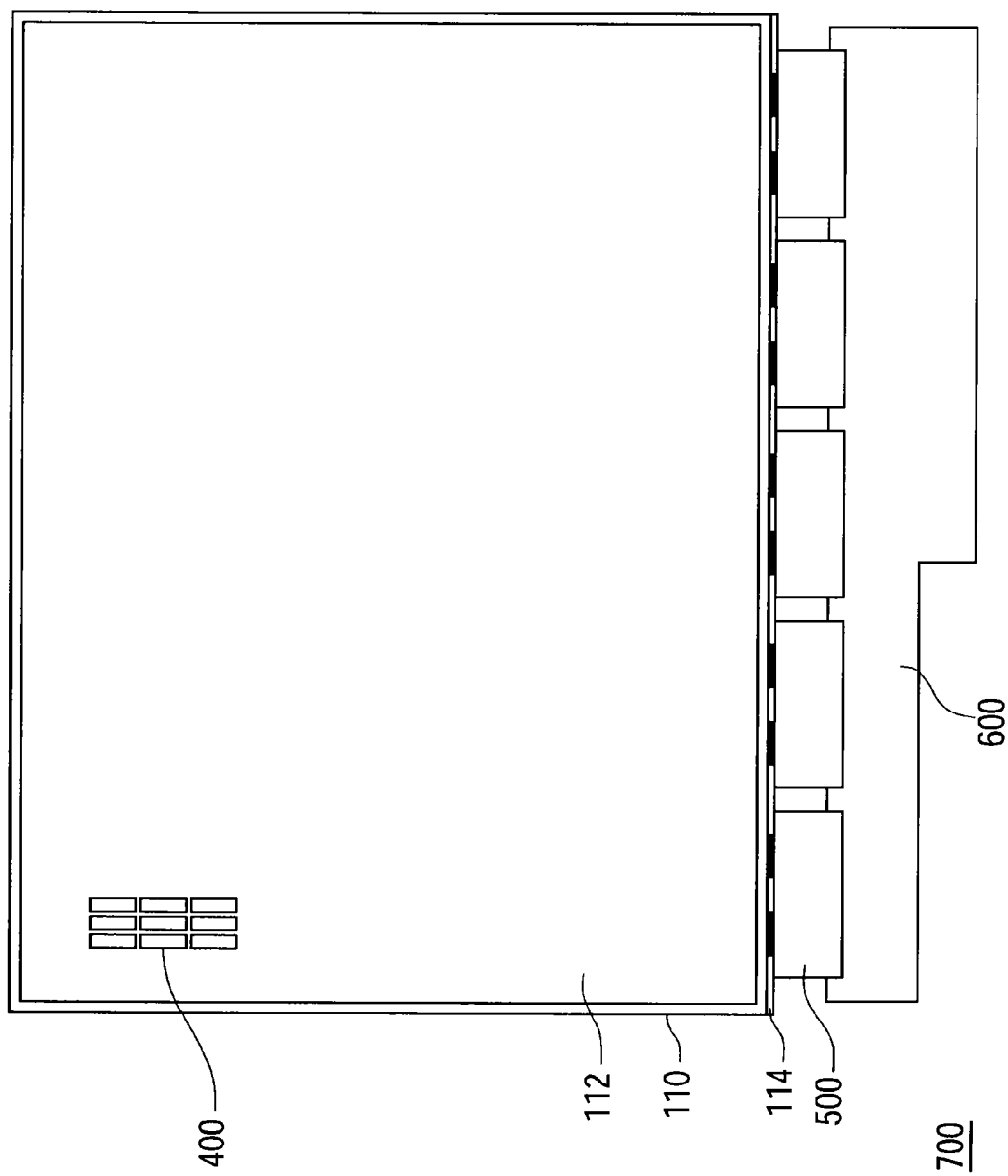
FIG. 4 is a schematic top view showing a display panel according to another embodiment of the present invention.

FIG. 4 is a schematic top view showing a display panel according to another embodiment of the present invention, wherein the same reference numbers with FIG. 1 stands for same or similar elements shown in FIG. 1. The bonding pad structure shown in FIG. 3A to FIG. 3C not only can be electrically connect to the touch sensor array of the touch panel, but also can be electrically connect to word lines and data lines (not shown) of a pixel array 400 of a typical display panel 700. Thus, the driving stability of the typical display pane can be enhanced to decrease display defects.

Hereinafter, examples are raised to explain the aforementioned bonding pad structure in detail. The aforementioned substrate 110a can be formed from a transparent rigid or flexible substrate, and the material thereof can be an organic or inorganic material, wherein the organic material can be such as plastics, and the inorganic material can be such as glass. The material forming the first conductive layer 120a and the second conductive layer 140a can be such as a metal or transparent conductive material, wherein the metal material can be such as aluminum or copper, and the transparent conductive material can be such as indium tin oxide (ITO), and the method forming the first conductive layer 120a and the second conductive layer 140a can be such as a sputtering method. The material forming the first protective layer 130a can be such as an inorganic material or organic resin material, wherein the inorganic material can be such as silicon nitride, silicon oxynitride or silicon oxide, etc., and the organic resin material can be such as an organic light-sensitive resin material such as polycarbonate, polyamide, polyurethane or copolymers of any combinations thereof. The method forming the first protective layer 130a can be such as a chemical vapor deposition (CVD) or spin coating method. The material forming the second protective layer 160a can be such as an organic resin material, wherein the organic resin material can be such as an organic light-sensitive resin material, such as polycarbonate, polyamide, polyurethane or copolymers of any combinations thereof. The method forming the second protective layer 160a can be such as a spin coating, slit coating or inkjet printing method.

It can be known from the above that the new bonding pad structure design can be applied on the touch panel. When the new bonding pad is used to connect the signal circuit board, the signal transmission stability can be enhanced, and the sensitivity and stability of the touch control function of the touch panel or touch display panel also can be enhanced. The new bonding pad structure design also can be applied on a common display panel for the problem of display defects caused by the unstable connection between the common display panel and peripheral driving circuits. Meanwhile, the new bonding pad structure design may increase process tolerance, thus greatly promoting product yield.

On actual applications, the touch panel using the aforementioned new bonding pad structure can be integrated with any appropriate existing display panel. With respect to the design of process, the new bonding pad structure can be fabricated alone or together with any appropriate existing display panel so as to form a touch display panel. After referring to the disclosure of the present invention, those skilled in the art may reasonable combine the contents of the present invention with the existing technologies on the applications of various possible fields.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A peripheral circuit of a touch panel, the touch panel comprising a central sensing array area and a peripheral non-array area, the peripheral circuit comprising a plurality of bonding pads, each of the bonding pads comprising:
   a first conductive layer located on a substrate within the peripheral non-array area, the first conductive layer comprising a circuit part and a terminal part, wherein the circuit part is located near the central sensing array area, and the terminal part is located far away from the central sensing array area;
   a first protective layer covering the circuit part and exposing the terminal part;

a second conductive layer located on the first protective layer and the terminal part, the second conductive layer comprising a bonding part located on the terminal part; and
   a second protective layer covering the second conductive layer and exposing a portion of the bonding part, wherein an outer edge of the second protective layer exceeds an outer edge of the first protective layer and further extends outwards a distance, thus covering the second conductive layer located above a junction area between the outer edge of the first protective layer and the terminal part.

2. The peripheral circuit as claimed in claim 1, wherein the distance is ranged between 1 μm and 40 μm.

3. The peripheral circuit as claimed in claim 1, wherein the first conductive layer is a metal layer or a transparent conductive layer.

4. The peripheral circuit as claimed in claim 1, wherein the first protective layer comprises silicon nitride, silicon oxynitride, silicon oxide or an organic light-sensitive resin material.

5. The peripheral circuit as claimed in claim 1, wherein the second conductive layer is a metal layer or a transparent conductive layer.

6. The peripheral circuit as claimed in claim 1, wherein the second protective layer comprises an organic light-sensitive resin material.

7. A touch panel, comprising:
   a peripheral circuit as claimed in claim 1; and
   a touch sensor array located on the substrate within the central sensing array area, the touch sensor array having a plurality of touch sensor cascades electrically connected to the bonding pads respectively.

8. The touch panel as claimed in claim 7, further comprising a signal circuit board electrically connected to the terminal part via the bonding part, wherein the signal circuit board is used for electrically connecting to an external circuit board.

9. The touch panel as claimed in claim 8, wherein the signal circuit board comprises a chip on glass (COG) board, a chip on film (COF) board, a tape automatic bonding (TAB) board or a flexible printed circuit (FPC) board.

10. A peripheral circuit of a display panel, the touch panel comprising a central array area and a peripheral non-array area, the peripheral circuit comprising a plurality of bonding pads, each of the bonding pads comprising:
   a first conductive layer located on a substrate within the peripheral non-array area, the first conductive layer comprising a circuit part and a terminal part, wherein the circuit part is located near the central array area, and the terminal part is located far away from the central array area;
   a first protective layer covering the circuit part and exposing the terminal part;
   a second conductive layer located on the first protective layer and the terminal part, the second conductive layer comprising a bonding part located on the terminal part; and
   a second protective layer covering the second conductive layer and exposing a portion of the bonding part, wherein an outer edge of the second protective layer exceeds an outer edge of the first protective layer and further extends outwards a distance, thus covering the second conductive layer located above a junction area between the outer edge of the first protective layer and the terminal part.

11. The peripheral circuit as claimed in claim 10, wherein the distance is ranged between 1 μm and 40 μm.

12. A display panel, comprising:
   a peripheral circuit as claimed in claim 10; and
   a pixel array located on the substrate within the central array area, wherein the pixel array is electrically connected to the bonding pads.

* * * * *